United States Patent [19]

Boekhorst

[11] 4,187,451
[45] Feb. 5, 1980

[54] COLOR PICTURE DISPLAY DEVICE WITH A CIRCUIT FOR GENERATING A SCREEN GRID VOLTAGE

[75] Inventor: Antonius Boekhorst, Eindhoven, Netherlands

[73] Assignee: U.S. Philips Corporation, New York, N.Y.

[21] Appl. No.: 932,288

[22] Filed: Aug. 8, 1978

[30] Foreign Application Priority Data

Sep. 12, 1977 [NL] Netherlands ................. 7709969

[51] Int. Cl.² ............................................. H01J 29/52
[52] U.S. Cl. ..................................... 315/381; 315/371; 358/220
[58] Field of Search ................... 315/370, 371, 381; 358/220

[56] References Cited

U.S. PATENT DOCUMENTS

| 3,185,886 | 5/1965 | Leitich et al. | 315/381 |
| 3,407,330 | 10/1968 | Wilmarth | 315/381 |
| 4,084,115 | 4/1978 | Peer | 315/371 |

Primary Examiner—Theodore M. Blum
Attorney, Agent, or Firm—Thomas A. Briody; William J. Streeter; Edward W. Goodman

[57] ABSTRACT

A color picture display device having a circuit for generating a screen grid voltage derived from the line deflection generator, while the high tension generator is separated. Via a resistance element, the screen grid is coupled to a source which generates a parabolic voltage of the field frequency with a curvature opposite to that obtained by rectifying the line flyback pulses owing to the east-west modulation, the resistance element, for example a voltage-dependent resistor, having in operation, a dynamic resistance which is many times lower than the static resistance thereof.

7 Claims, 3 Drawing Figures

COLOR PICTURE DISPLAY DEVICE WITH A CIRCUIT FOR GENERATING A SCREEN GRID VOLTAGE

BACKGROUND OF THE INVENTION

The invention relates to a color picture display device comprising a color picture display tube having at least a final anode and a screen grid electrode, a high tension generator for generating a high tension for the final anode and a line deflection generator for generating a line deflection current through a line deflection coil and comprising a rectifier for rectifying line flyback pulses for generating a supply voltage for the screen grid electrode, said generators being separated from one another, furthermore comprising a field deflection generator for generating a field deflection current through a field deflection coil and an east-west raster correction generator for the field frequency parabolic modulation of the amplitude of the line deflection current.

Such a color picture display device is known from the publication "Philips Application Information No. 238: Color television receiver with separated e.h.t. generator" dated Feb. 18, 1966. With a device wherein high tension is not derived from the line deflection generator, there is the possibility that the high tension is present while the line deflection generator is defective. The electron beam(s) generated in the picture display tube is (are) then present but there is no horizontal deflection, which may cause burning-in of the picture of the tube. Said publication explains advantages of a separated e.h.t. generator. A more recent reason for using separated generators is the fact that the high tension can be generated by a switched-mode power supply which can also generate other supply voltages for other sections of the display device and which has been increasingly used of late in view of its specific advantages.

To prevent the above-mentioned damage to the picture tube, the screen grid voltage is obtained in said publication by rectifying line flyback pulses of the line deflection generator. If this generator stops, the electrons in the picture tube are not accelerated sufficiently, and therefore, the beam current is cutoff. However, with color picture display devices, the line deflection current is subjected to an amplitude demodulation for the east-west raster correction. The screen grid voltage must not follow this modulation, which would cause an annoying brightness modulation, but, in view of the above-mentioned protection, this voltage must be smoothed with a time constant which is not too large, so that the rather low-frequency east-west component (50 or 60 Hz) is substantially not removed. In the prior art devices, this was not experienced as a drawback because the picture display tube thereof had a comparatively small deflection angle, namely 90°, for which tube the depth of modulation of the line deflection current need not be so large as for tubes having a larger deflection angle.

SUMMARY OF THE INVENTION

It is an object of the invention to provide a picture display device in which the protection of the display tube in the case the line deflection generator becomes defective can be effected in known manner without a considerable field frequency component being present in the screen grid voltage. To this end the device according to the invention is characterized in that the screen grid electrode is coupled via a resistance element to a source generating a parabolic voltage of the field frequency with a curvature opposite to that obtained by rectifying the line flyback pulses, the resistance element having in operation a dynamic resistance which is many times lower than the static resistance thereof.

An implementation of the device, in which a first output electrode of the switch of the line deflection generator is connected to a supply voltage source through an inductance, while a second output electrode of the switch is coupled to an amplifier of the field-frequency parabolic east-west raster correction signal, the rectifier being connected to the first output of the switch, is characterized in that the resistance element is coupled to the second output electrode of the switch.

A device according to the invention is preferably characterized in that the resistance element comprises a voltage dependent resistor.

DESCRIPTION OF THE DRAWINGS

The invention will be further explained by way of non-limitative example with reference to the accompanying Figures in which.

DESCRIPTION OF THE PREFERRED EMBODIMENTS

Figure 1:
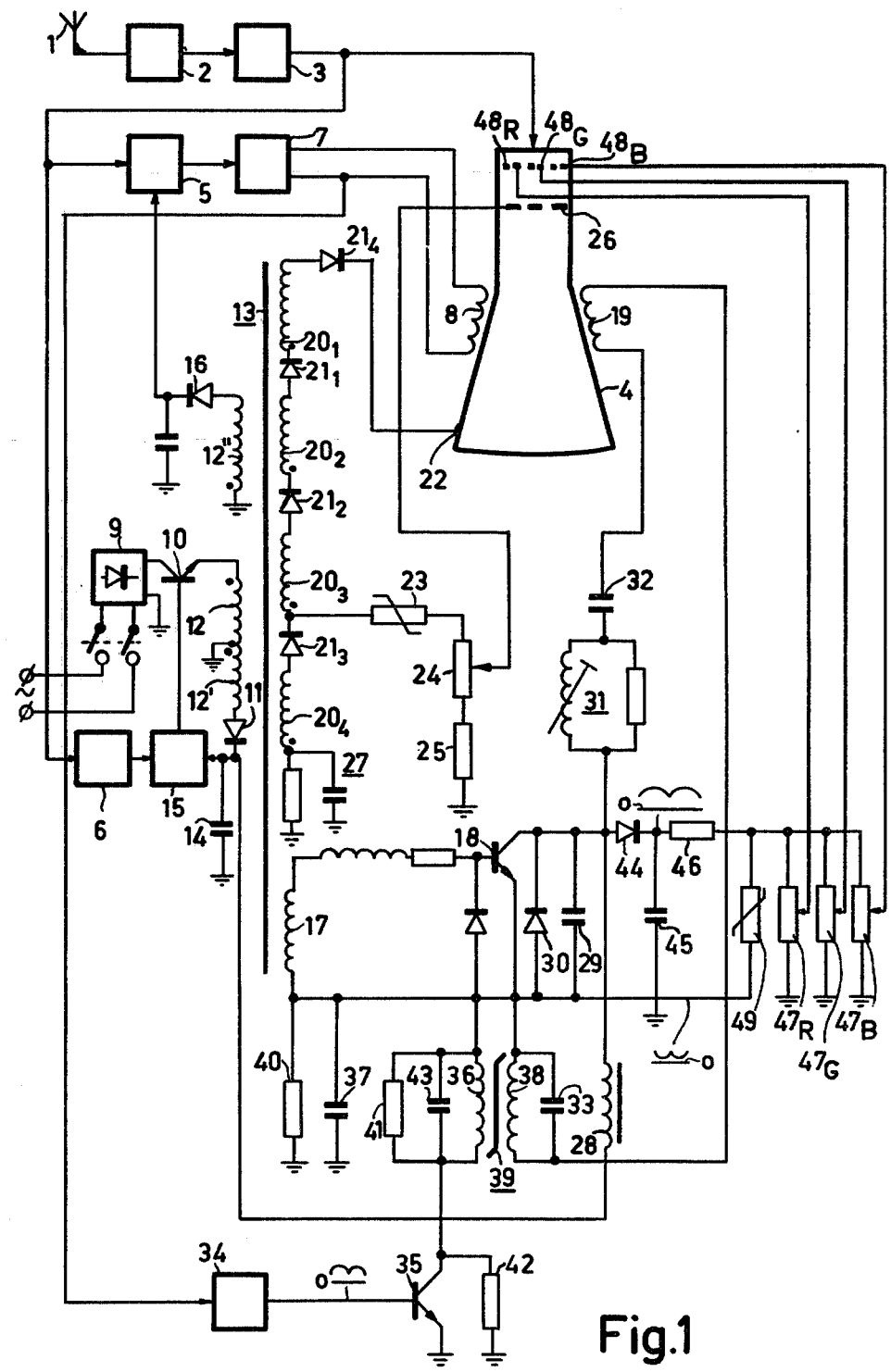
FIG. 1 shows a picture display device according to the invention.

FIG. 1 shows the circuit diagram of a color television receiver in which the sections which are not essential for the invention are not shown in detail. A receiving section 2 is connected to an aerial 1. The output signal thereof is processed in a signal processing stage 3 supplying luminance and chrominance signals to the control electrodes of a color picture display tube 4. Stage 3 also supplies field synchronization pulses to a field synchronization circuit 5 and line synchronizing pulses to a line synchronization circuit 6. The output signal of circuit 5 is applied to a field deflection generator 7 which generates a deflection current through the field deflection coil 8 for the vertical deflection of the electron beam(s) generated in tube 4.

For energy supply of the receiver, the voltage of the AC supply line is converted by means of a rectifier circuit 9 into an unstabilized d.c. voltage, which voltage is converted by a switched-mode power supply of known type into a plurality of stabilized d.c. voltages for the different sections of the receiver. Said circuit comprises a switching transistor 10, a diode 11, the primary winding 12 and a secondary winding 12' of a transformer 13 and a charging capacitor 14. The winding sense of the windings of transformer 13 is indicated by dots. Herefrom and from the conductivity direction of diode 11, it results that the power supply described is of the flyback type.

A control stage 15 supplies switching pulses to the base of transistor 10, these pulses being at the line frequency and generated by means of the output signal of line synchronizing circuit 6. The duration of these pulses and, consequently, the ratio of the conduction time of transistor 10 to the line period is controlled in dependency on the voltage across capacitor 14, so that this voltage remains constant in spite of variations in the supply line voltage and of the different loads on the switched-mode power supply.

Voltages which are each supplied to a rectifier are present across secondary windings of transformer 13. FIG. 1 shows a secondary winding 12" and a rectifier 16 with which a supply voltage for circuit 5 is generated. The supply voltages thus obtained are also constant. In known manner the signal present across a further secondary winding 17 of transformer 13 is applied between the base and the emitter of a switching transistor 18 which is part of a line deflection generator, still to be described, which generates a deflection current through the line deflection coil 19 for the horizontal deflection of the electron beam(s) generated in tube 4.

Additional secondary windings $20_1$, $20_2$, $20_3$ and $20_4$ of transformer 13 generate, in conjunction with three diodes $21_1$, $21_2$ and $21_3$ included therebetween as well as a fourth series-arranged diode $21_4$, the high tension which is supplied to the final anode 22 of tube 4, and which high tension amounts to approximately 25 kV. The series arrangement of a voltage dependent resistor 23, a potentiometer 24 and a resistor 25 is included between the junction of winding $20_3$ and diode $21_3$ on the one hand and ground on the other hand. The wiper of potentiometer 24 is connected to the focussing electrode(s) of tube 4 while a RC network 27 is included between winding $20_4$ and ground. In this manner and by the proper choice of the various elements, it is obtained that the focussing voltage, amounting to approximately 4.5 kV, varies in a satisfactory manner at variations in the high tension and in the beam current, namely with a relative variation which exceeds the relative variation of the high tension and which decreases when the beam current increases, the high tension having remained constant.

The collector of transistor 18 is connected via a choke 28 to the junction of diode 11 and capacitor 14 so that the voltage across the capacitor 14 serves as a supply voltage for the line deflection generator. In addition, this generator comprises a flyback capacitor 29 and a diode 30 which are in parallel to the collector-emitter path of transistor 18, as well as a linearity control 31 and a S-correction capacitor 32, which are in series with line deflection coil 19. A second S-correction capacitor 33 is included in this series circuit which is also in parallel to the collector-emitter path of transistor 18. As known, the base-collector diode of transistor 18 may function as a parallel diode with some types of transistors, so that diode 30 can be dispensed with. The control means of transistor 18 are also of a known nature.

A field-frequency sawtooth signal, derived from field deflection generator 7, is applied to an east-west correction control state 34, in which the sawtooth signal is converted into a parabolic signal. After having been amplified, the parabolic signal is applied to the base of a transistor-amplifier 35, for example of the npn-type, the emitter of which is connected to ground. The collector of transistor 35 is connected via a winding 36 to the emitter of transistor 18, this emitter being decoupled for line-frequency signals but not for field-frequency signals by means of a capacitor 37 of a suitable value. Consequently, a field-frequency parabolic voltage is present at the emitter of transistor 18 with a curvature opposite to that of the parabola present at the base of transistor 35 (see FIG. 1). The parabolic voltage at the emitter of transistor 18 must be thought as having been subtracted from the constant supply voltage present across capacitor 14. It will be evident that the amplitude of the sawtooth line deflection current flowing through the series arrangement of elements 31, 32, 19 and 33 is subjected to a field-frequency amplitude modulation, the amplitude being at its maximum in the middle of the field scan time and at its minimum at the beginning and at the end thereof. This is the modulation which is required for the correction of the so-called east-west raster distortion.

An additional correction is obtained because capacitor 33, which, together with capacitor 32, constitutes the capacitor of the so-called S-correction, is shunted by a winding 38, which winding 38 is the power winding of a transductor 39 whose control winding is winding 36. Because winding 36 is passed by a field-frequency current, the inductance value of winding 38 varies and, consequently, also the tuning frequency of the circuit formed by this winding 38 and capacitor 33 varies with the field frequency. A required field-frequency variation of the S-correction is the result thereof. The correct measure for this correction is obtained by the choice of the value of a resistor 40 included between the junction of the emitter of transistor 18 and winding 36 on the one hand, and ground on the other hand. A resistor 42 between the collector of transistor 35 and ground ensures a pre-magnetization current for transductor 39, while a capacitor 43, which is in parallel to winding 36, short-circuits voltages of line frequency, and a resistor 41, which is also in parallel to winding 36, is a damping resistor.

During the line scan period, in which the switch, formed by transistor 18 and diode 30, conducts, the scan voltage present across capacitor 32 and 33 is connected to deflection coil 19. This voltage is equal to the above-defined difference between the voltage of capacitor 14 and that at the emitter of transistor 18. During the line flyback period, in which said switch is cut off, a substantially sinusoidal flyback pulse, whose amplitude exceeds the scan voltage by a factor depending on the duration of the flyback period, is produced at the collector of transistor 18. If the ratio of this period to the line period is, for example, 15%, this factor is approximately equal to 9.5.

These pulses are rectified by means of a diode 44. Provided between the cathode of diode 44 and ground, there are on the one hand a capacitor 45 and on the other hand the series arrangement of a resistor 46 and a potentiometer $47_R$. Two potentiometers $47_G$ and $47_B$ are in parallel to potentiometer $47_R$. The wiper of each potentiometer is connected to a respective screen grid electrode $48_R$, $48_G$ and $48_B$ of picture tube 4. Because the values of resistor 46 and of potentiometers $47_R$, $47_G$ and $47_B$ are high, namely, for example, approximately 200 kΩ for resistor 46 and 2 MΩ for each potentiometer, the value of the voltage across capacitor 45 is approximately equal to the peak value of the flyback pulses. During a line period the scan voltage may be considered as being substantially constant. If this voltage has a value of approximately 110 V, a d.c. voltage is produced across capacitor 45, in the order of 1000 V, so that the screen grid voltages can be adjusted to the required value of approximately 500 V by means of potentiometers $47_R$, $47_G$ and $47_B$.

In a television receiver with separated high tension generator and in which the screen grid voltages are derived in known manner either from a supply voltage or from the high tension generator, the screen grid voltages remain in existence when the line deflection generator becomes defective. The electron beam generated in the picture display tubes are not deflected, which may cause damage to the picture screen of the tube by burning-in. In the receiver of FIG. 1, on the contrary, the screen grid voltages disappear when the line deflection generator becomes defective, for example because transistor 18 builds a short-circuit between its emitter and its collector. As a consequence, the electrons in picture tube 4 are not accelerated to sufficient degree and they cannot land on the picture screen. However, the protection outlined here can only operate satisfactorily on the condition that the charge of capacitor 45 flows rapidly off and, consequently, that the discharge time constant thereof is small. This is the case when the capacitance of capacitor 45 is, for example, 5 to 10 nF: the time constant is then equal to 8.5 to 17 ms, which is sufficiently small, while the line frequency components are nevertheless properly smoothed.

As, however, the amplitude of the flyback pulses as well as the value of the scan voltage are modulated at field frequency, a field-frequency varying voltage will be present across capacitor 45 (see FIG. 1) and, consequently, also at the screen grid electrodes. This will cause an undesired brightness modulation. To prevent this adverse effect, a voltage-dependent resistor 49 is disposed in accordance with the invention between the emitter of transistor 18 and the junction of resistor 46 and potentiometers $47_R$, $47_G$ and $47_B$.

Figure 2:
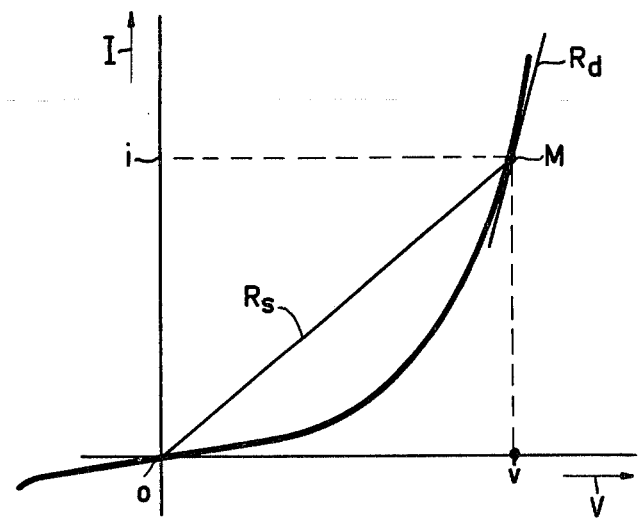
FIG. 2 shows the current-voltage characteristic of a voltage dependent resistor and FIG. 3 shows a variant of the device of FIG. 1.

FIG. 2 shows the current-voltage characteristic of a voltage-dependent resistor. For a given point M thereof, a certain voltage v across the resistor corresponds to a certain current i through it. From FIG. 2 it appears that a distinction can be made between the static resistance $R_s = (v/i)$, which is represented by the straight line connecting point M and the origin of the axes, and the dynamic resistance $R_d = (\Delta v/\Delta i)$ which is represented by the tangent in point M, the dynamic resistance being smaller than the static resistance. Resistor 49 must be chosen so that the static resistance thereof, taking of course the resistance values of potentiometers $47_R$, $47_G$ and $47_B$ into account, has the same ratio to the value of resistor 46 as the d.c. voltage drop across it to the d.c. voltage drop across resistor 46. Moreover, resistor 49 must be such that the dynamic resistance thereof is in the same ratio to the value of resistor 46 as the field-frequency voltage drop across it to the field-frequency drop across resistor 46. With a suitable choice of resistors 46 and 49 no a.c. voltage component will be present at the junction thereof with resistor 46 and, consequently, at electrodes $48_R$, $48_G$ and $48_B$.

The preceding will be further explained with reference to a number example. In this example the parabolic voltage at the emitter of transistor 18 has the curvature shown in FIG. 1, with a value of 10 V in the middle of the field scan period, and of 30 V at the beginning and at the end thereof, while the parabolic voltage across capacitor 45 has the opposite curvature, with a value of 1140 V in the middle of the field scan period and of 1000 V at the beginning and the end thereof. If a d.c. voltage of 700 V is required at the junction of resistors 46 and 49, the ratio of the value of resistor 46 to that of the parallel arrangement of potentiometers $47_R$, $47_G$, $47_B$ and the static resistance of resistor 49 is equal to approximately 4/7. If the static resistance is equal to the value of said parallel arrangement, $R_s$ is about 3.5 times the value of resistor 46, i.e. 700 kΩ. An a.c. voltage having an amplitude of 140 V and 20 V, respectively, is present across resistor 46 and 49, respectively, so that the dynamic resistance of resistor 49 must be seven times smaller than the value of resistor 46. The resistance values of potentiometers $47_R$, $47_G$ and $47_B$ need not be taken into account.

From the preceding it appears that the ratio $(R_d/R_s)$ of the dynamic to the static resistance of resistor 49 is approximately equal to 0.04. This ratio is specific to resistor 49. For, the characteristic of FIG. 2 satisfies the equation $v = Ci^\beta$, where C and $\beta$ are constants. It follows from the above definition that $R_s = Ci^{\beta-1}$, while $R_d = C\beta i^{\beta-1}$, $= \beta R_s$, so that it holds for resistor 49 that: $\beta = 0.04$. The constant C is determined by filling in, in the equation $v = Ci^\beta$, the values of v and i for the operating point M. This determines resistor 49.

Figure 3:
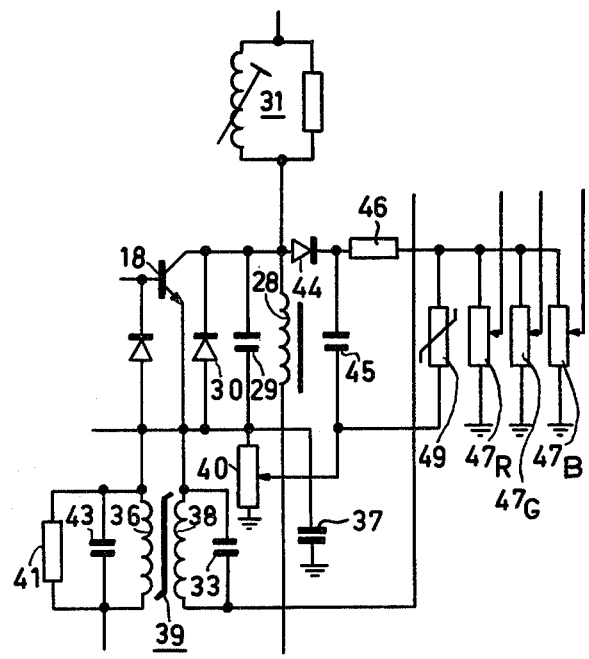

The circuit of FIG. 1 can be changed somewhat without detracting from the inventive idea. It is, for example, possible to connect the terminal, which is not connected to diode 44, of capacitor 45 to the emitter of transistor 18. It is alternatively possible to connect said terminal of capacitor 45 to the terminal, which is not connected to resistor 46, of resistor 49, the connecting point thus formed being connected to the wiper of resistor 40, which is constructed as a potentiometer (see FIG. 3). In this manner the above-defined compensation of the voltage component of field frequency can be accurately adjusted. In a further variant of FIG. 1, a resistor of, for example, approximately 15 kΩ is arranged in series with diode 44 for the protection thereof against high peak currents, so that resistor 46 can be fully or partly dispensed with.

In the preceding, the compensation uses the voltage of field-frequency present at the emitter of transistor 18 or a portion thereof. It will be obvious that another source, provided it has a suitable curvature for the parabola, can also be utilized, which will be necessary if the east-west modulation is performed in a different manner from that in FIG. 1, wherein the emitter voltage is not suitable for the invention. Such a case is encountered if transistor 35 is not present in the emitter lead of transistor 18 but in the collector lead thereof, while the emitter is connected to ground. The terminal, not connected to capacitor 45, of resistor 49 can then be connected to a suitable point of, for example, field deflection generator 7 or east-west control stage 34.

Most applications of voltage-dependent resistors utilize the voltage stabilizing property thereof which is the result of the fact (see FIG. 2) that the voltage across the resistor varies less quickly above point M than the current through it. In accordance with the invention, use is made of the fact that the dynamic resistance of the element is many times lower than the static resistance thereof. Components other than voltage-dependent resistors, which also have this property are, for example, diodes and zener diodes but these components can, for the present, withstand low voltages only, so that a very great number of these elements must be connected in series to obtain the same result. It is alternatively possible to replace resistor 49 for practical reasons by the series arrangement of two or more voltage-dependent resistors.

What is claimed is:

1. A color picture display device comprising a color picture display tube having at least a final anode and a screen grid electrode, a high tension generator for generating a high tension for the final anode and a line deflection generator for generating a line deflection current through a line deflection coil, and comprising a rectifier for rectifying line flyback pulses for generating a supply voltage for the screen gride electrode, said generators being separated from one another, said display device furthermore comprising a field deflection generator for generating a field deflection current through a field deflection coil and an east-west raster correction generator for the field-frequency parabolic modulation of the amplitude of the line deflection current, wherein the screen grid electrode is coupled via a resistance element to a source generating a parabolic voltage of the field frequency with a curvature opposite to that obtained by rectifying the line flyback pulses, the resistance element having in operation a dynamic resistance which is many times lower than the static resistance thereof.

2. A device as claimed in claim 1, in which a first output electrode of the switch of the line deflection generator is connected to a supply voltage source through an inductance, while a second output electrode of the switch is coupled to an amplifier of the field-frequency parabolic east-west raster correction signal, the rectifier being connected to the first output electrode of the switch, wherein the resistance element is coupled to the second output electrode of the switch.

3. A device as claimed in claim 1, wherein a resistor is included between the rectifier and the resistance element.

4. A device as claimed in claim 1, wherein a resistor is in series with the rectifier.

5. A device as claimed in claim 1, wherein the screen grid electrode is connected to the wiper of a trimming potentiometer and wherein this potentiometer is connected to the resistance element.

6. A device as claimed in claim 2, wherein the terminal, which is not coupled to the screen grid electrode, of the resistance element is connected to the wiper of a trimming potentiometer which is connected to the second output electrode of the switch.

7. A device as claimed in claim 1, wherein the resistance element comprises a voltage dependent resistor.

* * * * *